US006229563B1

(12) United States Patent
Miller, II et al.

(10) Patent No.: US 6,229,563 B1
(45) Date of Patent: May 8, 2001

(54) CAMERA INSERTION INTO A FURNACE

(75) Inventors: Dale R. Miller, II, Middleburg Heights; Robert D. Chambers, Richfield, both of OH (US)

(73) Assignee: Fosbel International Limited (GB)

( * ) Notice: Subject to any disclaimer, the term of this patent is extended or adjusted under 35 U.S.C. 154(b) by 0 days.

(21) Appl. No.: 09/115,626

(22) Filed: Jul. 14, 1998

(51) Int. Cl.[7] .................................................... H04N 7/18

(52) U.S. Cl. ............................... 348/83; 348/82; 348/84; 348/85

(58) Field of Search ................................ 348/82, 83, 84, 348/85, 66, 65

(56) References Cited

U.S. PATENT DOCUMENTS

| | | | | |
|---|---|---|---|---|
| 4,394,217 | | 7/1983 | Holz et al. . | |
| 4,747,582 | * | 5/1988 | Bergstrom | 266/226 |
| 4,840,474 | * | 6/1989 | Heft et al. | 348/82 |
| 5,066,122 | | 11/1991 | Krauter . | |
| 5,378,493 | | 1/1995 | Zivkovic . | |
| 5,615,953 | | 4/1997 | Moskal . | |
| 5,689,734 | * | 11/1997 | Bauer et al. | 348/82 |
| 5,831,668 | * | 11/1998 | Hirvonen et al. | 348/83 |
| 6,025,625 | * | 2/2000 | Cannon | 348/82 |

OTHER PUBLICATIONS

01 Products Brochure “PT–01” (1997).
“Portable Endoscope” brochure, kinoptik Inc. (1997).
“Refractory Renewal without Shutdown” brochure, Fosbel Inc. (1997).

* cited by examiner

*Primary Examiner*—Andy Rao
(74) *Attorney, Agent, or Firm*—Nixon & Vanderhye P.C.

(57) ABSTRACT

A monitoring system for a furnace, such as one in which ceramic welding is practiced, where the temperature often exceeds 2000° F., allows substantially distortion-free, real time, monitoring. In order to monitor the furnace, a fluid cooled lance designed to be held by an operator outside the furnace has a camera (e.g. microcamera, endoscope or boroscope) mounted at the free end of the lance. An electrical connection is provided between the camera and a portable control unit mounted exteriorly of the furnace. A stationary video monitor and recorder may be mounted in the control unit, and a portable real time video monitor is mounted on the operator's headgear so that it may be seen by the operator when manipulating the lance. The lance is cooled by a water jacket having an inlet and outlet at the end of the lance exterior of the furnace, and the water jacket substantially surrounds the camera. The camera is mounted in a waterproof metal casing and the cord is covered by an aramid reinforced covering adjacent the camera. A second, sapphire, lens protects the camera lens from radiant heat, and air under pressure also helps cool the camera.

22 Claims, 3 Drawing Sheets

CAMERA INSERTION INTO A FURNACE

BACKGROUND AND SUMMARY OF THE INVENTION

There are many circumstances in which it is desirable to be able to inspect areas of a hot furnace. For example, when determining whether a furnace needs repair by ceramic welding techniques (such as is described in U.S. Pat. No. 5,378,493, the disclosure of which is incorporated by reference herein) or in determining whether a repair has properly been made, especially for difficult to access portions of the furnace, it is difficult to get an accurate determination of existing conditions. In most conventional furnace camera systems, because of the adverse conditions inside the furnace the camera remains on the outside of the furnace and a water-cooled lens tube is inserted into the furnace which communicates with the camera. The water-cooled lens tube is typically short in length and straight, and can only view objects which are in the direct line of site of the end of the lens tube. This not only restricts the areas of the furnace that can be viewed, but can distort the view. The 5,378,493 patent incorporated by reference herein positions a CCD camera near, but necessarily spaced from, the end of a lance that is used for applying the ceramic welding composition, and the camera is cooled by the lance's water jacket, and a curtain of air may be passed over the camera's lens to keep it clear of particles and to facilitate cooling thereof. However, because of the positioning of the camera on the lance an accurate view of all portions of the furnace is still not provided, nor is the camera as interactive with the operator as desired.

According to the present invention, a video camera system is provided, as well as a method of inspecting a furnace while at high temperature using the camera, which allow virtually any portion of the furnace to be accurately viewed, and which can easily provide the operator with real time feedback so as to facilitate a wide variety of operations within the furnace. The system according to the invention is simple, with a minimum number of components, yet with optimized utility, and is useful in association with furnaces of almost any practical temperature range, including over 2000° F., in fact to temperatures approaching 3000° F.

The shutter speed of the camera provided according to the invention may be readily—in fact substantially instantly—varied. This allows the camera to stop "blinding" of the signal (i.e. too much light) and allows use in areas where there are substantial quantities of UV, visible, and IR light. The speed of the shutter can vary from 1/60 per second to 1/10,000 per second, and can be controlled manually through a CCU and a monitor or video headset.

According to one aspect of the present invention a monitoring system for a furnace is provided comprising the following components: A fluid cooled lance having a first end adapted to be held by an operator, and a second end adapted to be inserted into the furnace. A camera (e.g. microcamera, endoscope, or boroscope, typically with a lateral sight angle of about 30°) is mounted in the lance at the second end thereof, and cooled along with the lance, and including a camera lens. An electrical connection to the camera mounted within the lance, and extending exteriorly of the furnace. And a control unit (e.g. in a portable casing, e.g. having a total weight of about 20 pounds or less) mounted exteriorly of the furnace, and connected to the electrical connection. The portable casing is desirably airtight and/or watertight.

The camera is preferably in a waterproof metal casing (to protect the camera from condensation) with the electrical cord extending outwardly from the casing substantially opposite the lens, and the camera lens is preferably protected from radiant heat by a second heat resistant but substantially distortion free (e.g. sapphire) lens. The electrical cord is covered at least adjacent the casing with an aramid (e.g. kevlar)-reinforced covering material. Air cooling passages are also preferably provided which are connected up to air under pressure (e.g. at least about 30 psi, e.g. standard about 65 psi compressed air) to further cool the camera.

The system further comprises a substantially stationary video monitor in the control unit operatively connected to the camera, and preferably includes headgear for the operator of the lance. A portable real time video monitor is mechanically mounted on the headgear so that it may be seen by the operator, and the video monitor is operatively connected to the camera through the control unit. A video controller may also be mounted in the control unit. For simplicity, a single electrical power source is connected to the control unit for powering all of the components of the system.

The lance is cooled by a water jacket including an inlet and an outlet both disposed adjacent the first end of the lance, and the water jacket substantially surrounds the entire periphery of the camera. The lance water jacket and the camera are constructed and positioned so that the camera may operate at a temperature of over 2000° F. in the furnace, and allow ready inspection of virtually all portions of the furnace in an accurate manner.

According to another aspect of the present invention a monitoring system for a furnace is provided comprising the following components: A fluid cooled lance having a first end adapted to be held by an operator, and a second end adapted to be inserted into the furnace. A camera mounted in the lance adjacent the second end thereof, and cooled along with the lance, and including a camera lens. An electrical connection to the camera mounted within the lance, and extending exteriorly of the furnace. A control unit mounted exteriorly of the furnace, and connected to the electrical connection. Headgear for the operator of the lance. And a portable real time video monitor mechanically mounted on the headgear so that it may be seen by the operator, and operatively connected to the camera through the control unit. The details of the system may be as described above.

According to another aspect of the present invention a method of inspecting a furnace while a temperature of over 400° F. (e.g. over 2000° F., up to about 3000° F.) using a video camera mounted in a free end of the lance, is provided. The method comprises: [a] inserting the lance free end into the furnace while at a temperature of over 400 degrees F. (e.g. over 2000° F.), and moving the lance free end around within the furnace; [b] cooling the camera by circulating cooling fluid in a cooling fluid jacket around the camera; and [c] outside of the furnace, viewing an area of the furnace in the field of view of the camera in a substantially undistorted manner on a substantially real time basis.

[a] is typically practiced by a human operator wearing headgear, and [c] is then preferably practiced viewing a real time video monitor mounted on his or her headgear. The method further comprises viewing an area of the furnace in the field of view of the camera on a substantially real time basis that is substantially stationary (during use) in location (such as a video monitor in a control unit), and recording the viewed images from the camera at the substantially stationary location (e.g. with a conventional video recorded mounted in the same control unit). The method may further comprise providing a single power source to the system, including powering the camera and any other electrical components or structures associated with it. [b] is preferably practiced by substantially continuously circulating liquid in a water jacket, and also preferably directing compressed air (e.g. at least about 30 psi) past the camera's metal casing to further cool it. If the method is practiced through a relatively low temperature furnace cooling may be done by circulating gas (such as air) rather than a liquid, or a liquid and gas.

It is the primary object of the present invention to provide a simple yet effective system and. method for inspecting virtually all areas of the furnace while at high temperature, in a simple and effective manner. This and other objects of the invention will become clear from an inspection of the detailed description of the invention, and from the appended claims.

DETAILED DESCRIPTION OF THE DRAWINGS

Figure 1:
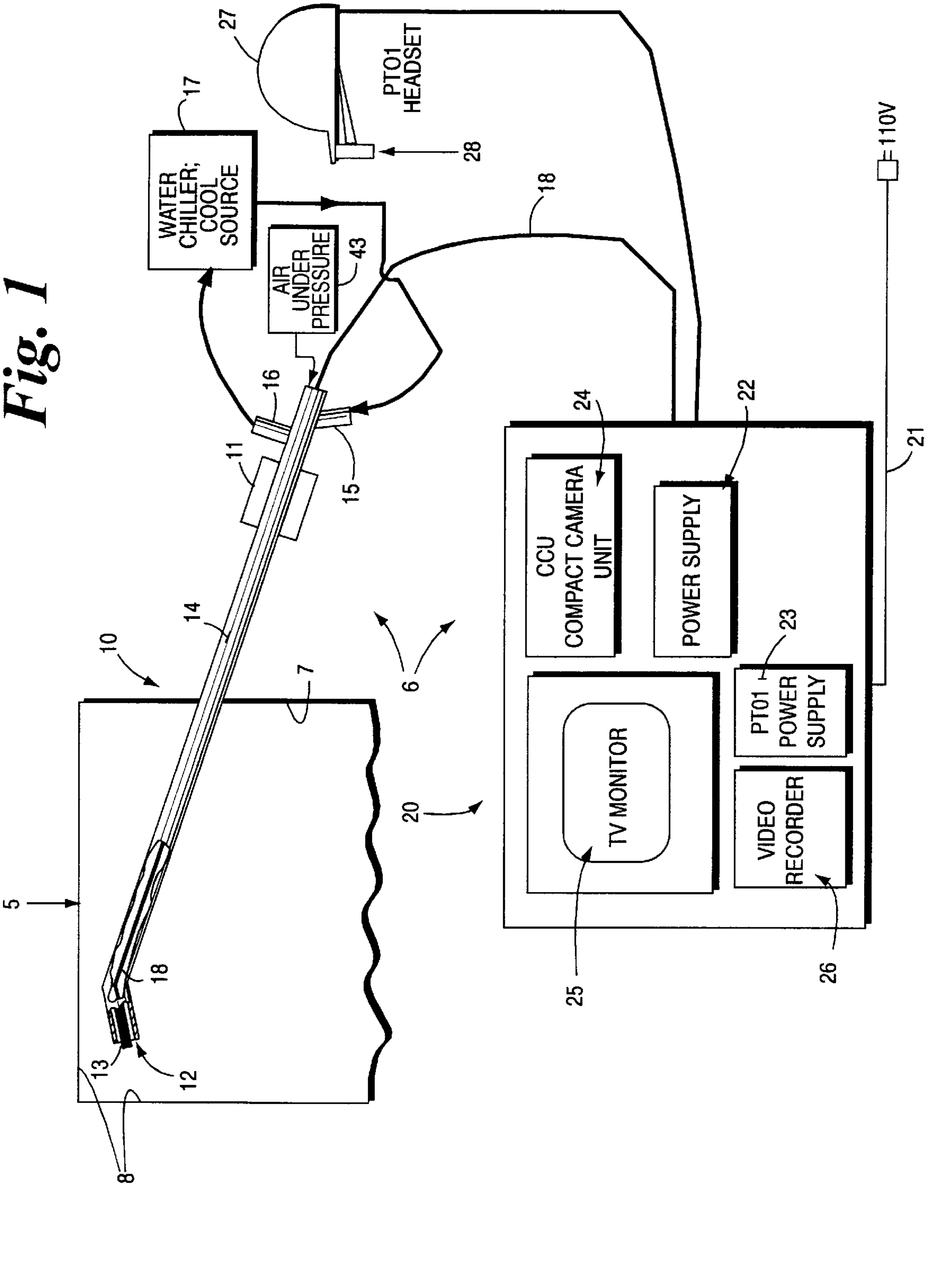
FIG. 1 is a schematic view illustrating the basic components of the system of the present invention, for practicing the method according to the invention.

A system for monitoring a furnace 5 is shown generally by reference numeral 6 in FIG. 1. The furnace 5 is shown schematically and may be any conventional type of furnace, typically one operating at over 400° F., and in fact over 2000° F., e.g. up to about 3000° F. The furnace 5 has one or more walls 7 which can be penetrated with a lance, and a plurality of interior surfaces, including the surfaces 8, that are desirably accurately viewed even when the furnace 5 is at a high temperature.

The system 6 includes a lance 10 having a first end which may include a handle 11 for ease of manipulation by an operator, and which includes a second, free, end 12. A camera 13 is mounted preferably at the free end 12, but at least adjacent thereto. The lance 10 is cooled by a cooling fluid jacket, preferably a water jacket 14 which has an inlet 15 and an outlet 16 adjacent the first end of the lance 10 (exterior of the furnace 5). The inlet 15 and outlet 16 are connected, in a conventional manner, to a water chiller, or cool source of water and sewer, illustrated schematically at 17 in FIG. 1, as is conventional per se. While a water-cooled jacket 14, with the components 15–17 is preferred, if the temperature in the furnace 5 will not be particularly high, then a gas, such as air, may be used as the cooling fluid.

The lance 10 may be a specially designed lance for receipt of the camera 13, or it may be a modified version of the conventional ceramic welding lances which are commonly used to practice ceramic welding, such as used by Fosbel Inc. of Berea, Ohio.

The camera 13 is typically a microcamera, endoscope, or boroscope. If a microcamera, the camera 13 may be a modified version of a conventional miniature video camera, such as shown in U.S. Pat. No. 5,066,122, which is capable of providing a substantially completely accurate (preferably full color) image of a remote area, such as the furnace interior surfaces 8. Two particularly desirable endoscope cameras that may be utilized as the camera 13 are available from Kinoptik Inc., Type 373.A.00D1, and Type 360.A.33.00, both with an approximately 30° (angle a in FIG. 2) lateral sight. The lateral sight angle a preferably is at least about 20°, e.g. about 20°–50°, regardless of whether the camera 13 is a microcamera, endoscope or boroscope.

The system 6 further comprises an electrical connection 18 from the microcamera 13 to a control unit 20 exterior of the furnace wall 7. While the control unit 20 may be mounted on wheels or more preferably can be mounted in a carrying case that weights less than about 20 pounds (9 kilograms), excluding the lance 10. The unit 20 may be in an airtight or watertight casing, and is substantially stationary during use, and includes all of the necessary electrical components, power supplies, etc. for the system 6. For example, it includes a single electrical power source —such as a 110 volt line connected by the cord 21 to the unit 20—for powering all of the components of the system 6, a single line 21 being provided for simplicity. Mounted within the unit 20 is a power supply 22 for the camera 13 (and operatively connected to the electrical connection 18), a portable field monitor power supply 23, a CCU 24, a substantially stationary video monitor 25, and a conventional video recorder 26.

According to the present invention the operator, who wields the lance 10, typically wears headgear 27, usually in the form of a hard hat, but perhaps in some cases a complete protective hood. According to the invention a portable real time video monitor 28 is mechanically connected to the headgear 27 and positioned so that the monitor 28 may be readily seen by the operator. The real time video monitor 28 may be, for example, that sold under the trademark PT-01, available from O1 Products, Westlake Village, Calif. The portable real time video monitor 28 is operatively connected to the camera 13 through the control unit 20, that is to the power supply 23, and through the CCU 24. The mechanical connection between the video monitor 28 and the headgear 27 may be any conventional connection, such as brackets attached by fasteners, adhesive, clamps, or the like.

Utilizing the system 6, an operator or operators can inspect the furnace 5, particularly the interior surfaces 8 thereof, even if normally difficult to access, even while the furnace 5 is at a high temperature (e.g. over 400° F., even over 2000° F., up to about 3000° F., and any temperature less than about 3000° F.) by using the camera 13 in the free end 12 of the lance 10. The method comprises:

Inserting the lance 10 free end 12 into the furnace 5 (e.g. through designed openings in the wall 7, or the like, as is conventional per se) while the furnace 5 is at high temperature, and moving the lance free end 12 around within the furnace 5, to inspect the surfaces 8. The inspection can be accomplished to see what needs to be repaired, to inspect a ceramic weld or repair, or for any other purpose. Typically this is practiced by a human operator manipulating the lance 10 by holding it adjacent the handle 11 thereof and wearing the headgear 27, with the real time video monitor 28.

Cooling the camera 13 by circulating cooling fluid (preferably a liquid such as water) in a cooling fluid jacket 14 around the camera 13 (such as at all portions except for the lens of the camera 13). This is preferably practiced by continuously circulating liquid in the water jacket 14, in the inlet 15, out the outlet 16, and to or from the source or chiller 17. And outside the furnace 5 viewing an area of the furnace and the field of the view of the camera 13 (such as the surfaces 8) in a substantially undistorted manner on a substantially real time basis. This is practiced typically by the operator viewing the real time video monitor 28 mounted on the headgear 27, and/or by viewing the video monitor 25 in control unit 20. Preferably the viewed images are also recorded by the video recorder 26. The method may further comprise providing a single power source (such as cord 21) to the system 6, including for powering the camera 13 and any other electrical components or structures associated therewith (such as the CCU 24, monitors 25, 28, and recorder 26), and making the unit 20 highly portable.

The shutter speed of the camera 13 may be adjusted (e.g. between 1/60–1/10,000 per second) exteriorly of the furnace in response to viewing the monitors 25 or 28, using the CCU 24. In response to a "blinding" condition the operator adjusts shutter speed manually until a "blinding" condition no longer exists.

Figure 2:
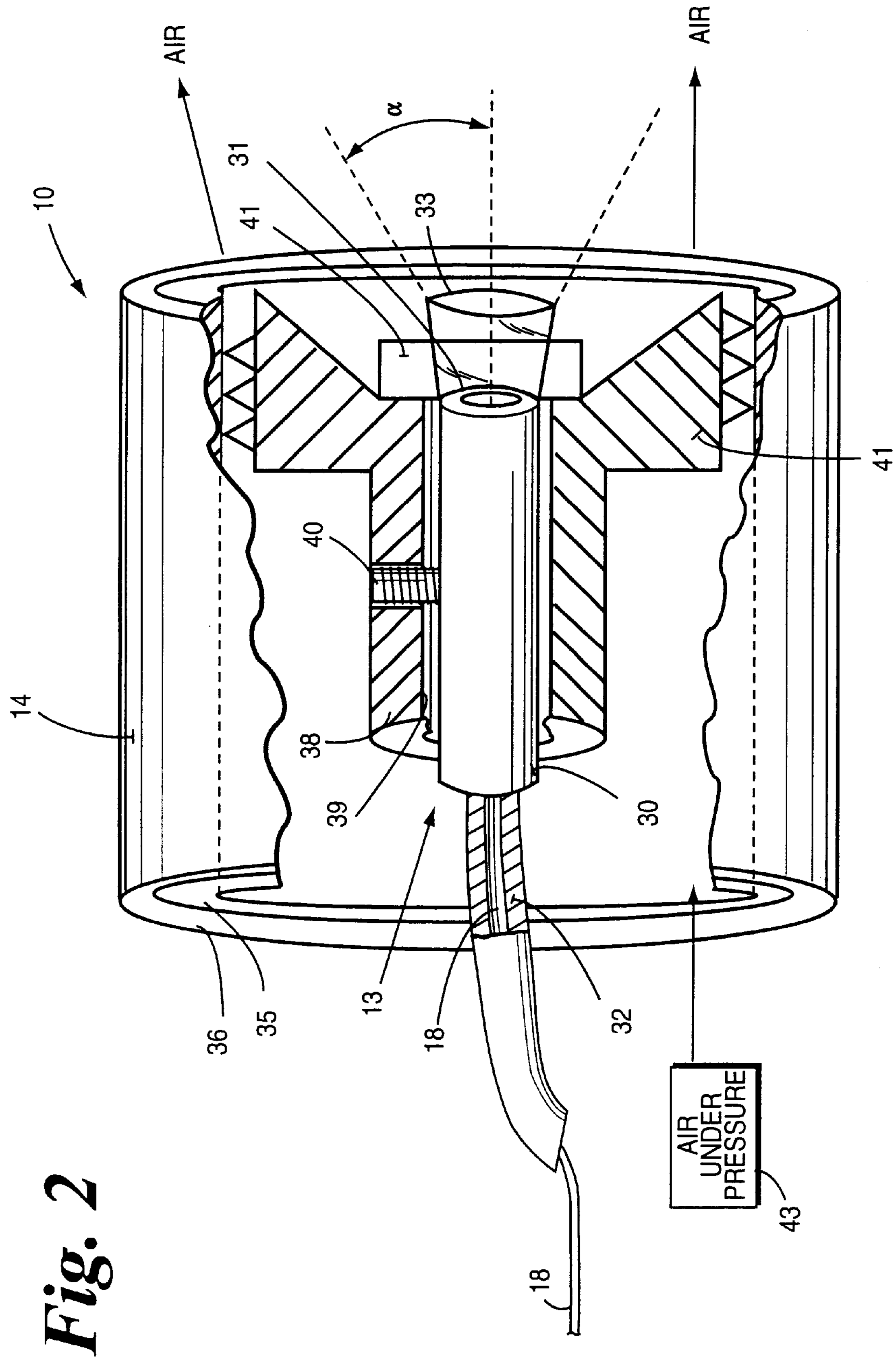
FIG. 2 is a side schematic perspective view, partly in cross-section and partly in elevation, of the details of the camera and its mounting in the lance according to the invention.
Figure 3:
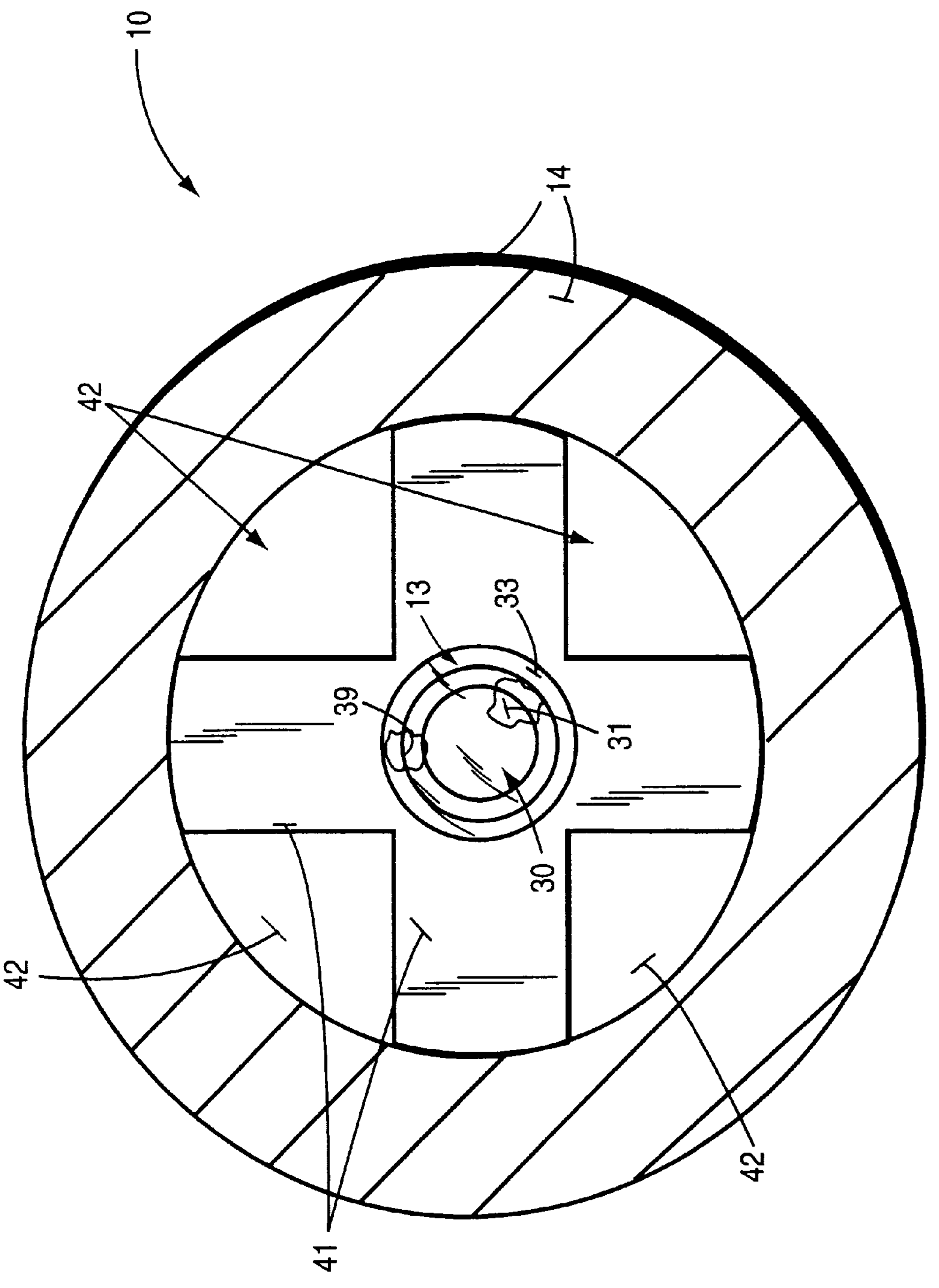
FIG. 3 is a front view of the camera and lance of FIG. 2.

The details of the manner in which the camera 13 is protected so that it can function properly even in a furnace at high temperature (e.g. even 2000° F. or above) is seen in FIGS. 2 and 3.

FIGS. 2 and 3 show a Type 373.A.00.D1 endoscope as the camera 13. The plastic housing for that endoscope has been replaced with the waterproof metal (e.g. steel) casing 30, which protects the camera from condensation. The electrical connections at the back of the camera 13 are adapted for the waterproof metal casing 30 too, so that the electrical connection 18 passes outside of the casing 30 from substantially the opposite side thereof as the camera lens 31. The conventional cord 18 is covered with an aramid (e.g. Kevlar)-reinforced covering 32 to prevent damage to it, the covering 32 at least being adjacent the housing 30 and possibly extending substantially the length of the lance 10.

In order to protect the lens 31 from radiant heat a second lens 33 may be mounted in front of lens 31. The lens 33 is of heat resistant, substantially distortion free material, e.g. sapphire. While for clarity of illustration in FIGS. 2 and 3 the lens 33 is shown mounted far in front of the lens 31, it may be mounted by the metal casing 30 just in front of lens 31.

FIGS. 2 and 3 also show a particular mounting for the casing 30 in the lance 10, and the inner and outer conventional layers 35, 36, for the water jacket 14, which substantially peripherally surrounds the casing 30. The camera 13 and casing 30 are mounted in the mounting sleeve 38 interior bore 39, and a set screw 40 or like functioning device holds the casing 30 in the position that it is positioned at with respect top the open front of the lance 10. The position can be adjusted by loosening screw 40 and moving the casing 30 to a new position within the sleeve 38.

The sleeve 38 is mounted to the water jacket 14 of the lance 10 by the cross shaped (in the frontal view of FIG. 3) mounting collar 41, which may be integral with the sleeve 38. The cross shape of the collar 41 (other shapes, e.g. having two, three, or more than four "spokes" may alternatively be utilized) defines air ducts 42 around the internal periphery of the water jacket 14 for the passage of compressed air from a source 43 (see FIGS. 1 and 2). The compressed air rushing over the sleeve 38 and through the air ducts 42 into the furnace 5 helps cool the camera 13. The air under pressure from source 43 is preferably typically at a pressure of at least about 30 psi, and more preferably is a conventional source of plant compressed air, e.g. at a pressure of about 65 psi.

It will thus be seen that according to the present invention a simple, yet effective method and system for monitoring a furnace, even during high temperature operation thereof, in a simple and effective manner, have been provided. While the invention has been herein shown and described in what is presently conceived to be the most practical and preferred embodiment thereof, it will be apparent to those of ordinary skill in the art that modifications may be made thereof within the scope of the invention, which scope is to be accorded the broadest interpretation of the claims so as to encompass all equivalent systems and methods.

What is claimed is:

1. A monitoring system for a furnace, comprising:

a fluid cooled lance having a first end adapted to be held by an operator, and a second end adapted to be inserted into the furnace;

a camera mounted in said lance at said second end thereof, and cooled along with said lance, and including a camera lens;

an electrical connection to said camera mounted within said lance, and extending exteriorly of the furnace; and a control unit mounted exteriorly of the furnace, and connected to said electrical connection.

2. A system as recited in claim 1 further comprising: a video monitor in said control unit operatively connected to said camera.

3. A system as recited in claim 2 further comprising headgear for the operator of said lance; and a portable real time video monitor mechanically mounted on said headgear so that it may be seen by the operator, and operatively connected to said camera through control unit.

4. A system as recited in claim 3 further comprising a video recorder in said control unit, and further comprising a single electrical power source connected to said control unit for powering all components of said system.

5. A system as recited in claim 1 wherein said lance is cooled by a water jacket including an inlet and an outlet both disposed adjacent said first end of said lance; and wherein said water jacket substantially surrounds said camera except said lens.

6. A system as recited in claim 5 wherein the camera and water jacket are constructed and positioned so that the camera may operate at a temperature of over 2000° F. in the furnace.

7. A system as recited in claim 1 wherein said camera is contained within a waterproof metal casing, and wherein said electrical connection comprises an electrical cord extending outwardly from said waterproof metal casing substantially opposite said camera lens.

8. A system as recited in claim 7 further comprising an aramid-reinforced cover covering said electrical cord.

9. A system as recited in claim 8 further comprising a second lens of heat resistant substantially distortion-free material in front of said camera lens to protect said camera lens from radiant heat.

10. A system as recited in claim 1 further comprising a second lens of heat resistant substantially distortion-free material in front of said camera lens to protect said camera lens from radiant heat.

11. A system as recited in claim 10 further comprising air cooling passages in said lance for further cooling said camera with air under pressure of at least about 20 psi; and wherein said second lens is a sapphire lens.

12. A monitoring system for a furnace, comprising:

a fluid cooled lance having a first end adapted to be held by an operator, and a second end adapted to be inserted into the furnace;

a camera mounted in said lance adjacent said second end thereof, and cooled along with said lance, and including a camera lens;

an electrical connection to said camera mounted within said lance, and extending exteriorly of the furnace;

a control unit mounted exteriorly of the furnace, and connected to said electrical connection;

headgear for the operator of said lance; and a portable real time video monitor mechanically mounted on said headgear so that it may be seen by the operator, and operatively connected to said camera through said control unit.

13. A system as recited in claim 12 wherein said camera comprises a microcamera, endoscope, or boroscope, and has a lateral sight angle of at least about 20°.

14. A system as recited in claim 13 wherein said camera is contained within a waterproof metal casing, and wherein said electrical connection comprises an electrical cord extending outwardly from said waterproof metal casing substantially opposite said camera lens.

15. A system as recited in claim 14 further comprising a sapphire lens positioned on the opposite side of said camera lens from said electrical cord so as to protect said camera lens from radiant heat.

16. A system as recited in claim 12 wherein said control unit comprises a video monitor, a video recorder, and a single electrical power source for powering all components of said system, said control unit being portable and having a weight of less than about 20 pounds.

17. A method of inspecting a furnace while at a temperature of over 400° F. using a camera mounted in a free end of a lance, comprising:

[a] inserting the lance free end into the furnace while at a temperature of over 400 degrees F., and moving the lance free end around within the furnace;

[b] cooling the camera by circulating cooling fluid in a cooling fluid jacket around the camera; and

[c] outside of the furnace, viewing an area of the furnace in the field of view of the camera in a substantially undistorted manner on a substantially real time basis.

18. A method as recited in claim 17 wherein [a] is practiced by a human operator wearing headgear; and wherein [c] is practiced by the operator viewing a real time video monitor mounted on the operator's headgear.

19. A method as recited in claim 18 further comprising viewing an area of the furnace in the field of view of the camera on a substantially real time basis at a substantially stationary location, and recording the viewed images from the camera at the substantially stationary location.

20. A method as recited in claim 17 wherein [b] is practiced by substantially continuously circulating liquid in a water jacket, and also by directing air under a pressure of at least 30 psi adjacent the camera.

21. A method as recited in claim 19 further comprising providing a single power source to the system, including for powering the camera and any other electrical components or structures associated therewith.

22. A method as recited in claim 17 wherein [a] is practiced at a temperature over 2000° F., and further comprising adjusting the camera shutter speed outside the furnace in response to [c].

* * * * *